US 6,634,781 B2

(12) United States Patent
Bowens et al.

(10) Patent No.: US 6,634,781 B2
(45) Date of Patent: Oct. 21, 2003

(54) WEAR RESISTANT EXTRUDER SCREW

(75) Inventors: Steven H. Bowens, Westchester, PA (US); Anthony L. Owoc, North Wales, PA (US); Arthur A. Hendrick, Greensburg, PA (US)

(73) Assignee: Saint Gobain Industrial Ceramics, Inc., Latrobe, PA (US)

( * ) Notice: Subject to any disclaimer, the term of this patent is extended or adjusted under 35 U.S.C. 154(b) by 477 days.

(21) Appl. No.: 09/757,769

(22) Filed: Jan. 10, 2001

(65) Prior Publication Data

US 2002/0131328 A1 Sep. 19, 2002

(51) Int. Cl.[7] .................................................. B29B 7/42
(52) U.S. Cl. ....................................................... 366/79
(58) Field of Search ............................... 366/79, 83–85, 366/318; 100/145, 146; 198/657, 676; 425/204, 208, 209

(56) References Cited

U.S. PATENT DOCUMENTS

| 3,998,318 A | * 12/1976 | McAlarney |
| 4,003,115 A | * 1/1977 | Fisher |
| 4,169,637 A | 10/1979 | Voitas |
| 4,223,601 A | * 9/1980 | Knuth et al. |
| 4,228,142 A | 10/1980 | Holcombe, Jr. et al. |
| 4,309,115 A | * 1/1982 | Klein et al. |
| 4,321,229 A | 3/1982 | Blakeslee, III et al. |
| 4,588,608 A | * 5/1986 | Jackson et al. |
| 4,626,477 A | * 12/1986 | Jackson et al. |
| 4,729,789 A | 3/1988 | Ide et al. |
| 4,775,548 A | 10/1988 | Lankford, Jr. |
| 4,835,062 A | 5/1989 | Holleck |
| 4,919,773 A | 4/1990 | Naik |
| 4,949,836 A | * 8/1990 | Schostek |
| 5,078,837 A | 1/1992 | Descamp et al. |
| 5,135,378 A | * 8/1992 | Catton |
| 5,156,860 A | * 10/1992 | Kojima et al. |
| 5,236,521 A | * 8/1993 | Shikanai et al. |
| 5,318,840 A | 6/1994 | Ikeda et al. |
| 5,328,513 A | 7/1994 | Suzuki et al. |
| 5,348,453 A | * 9/1994 | Baran et al. |
| 5,368,383 A | * 11/1994 | Peter et al. |
| 5,593,234 A | 1/1997 | Liston |
| 5,673,618 A | * 10/1997 | Little |
| 5,935,350 A | 8/1999 | Raghu et al. |
| 6,042,951 A | 3/2000 | Kojima et al. |
| 6,155,705 A | * 12/2000 | Douris et al. |
| 2002/0136083 A1 | * 9/2002 | Haberer |

FOREIGN PATENT DOCUMENTS

| DE | 3638088 | * 5/1988 |
| DE | 3718778 | * 12/1988 |
| DE | 3718779 | * 12/1988 |
| DE | 4130207 | * 3/1993 |
| DE | 4328160 | * 4/1994 |

(List continued on next page.)

Primary Examiner—Charles E. Cooley
(74) Attorney, Agent, or Firm—Duane Morris LLP

(57) ABSTRACT

Wear resistant extruder screws and methods for their manufacture are provided. The extruder screws include a base alloy screw body having a plurality of flights, a major outer diameter and a minor inner diameter. Each of the flights includes a pair of flight sides disposed between the major outer diameter and the minor inner diameter. The flight sides and minor inner diameter define a root area proximate to their juncture. The preferred extruder screws of this invention include a bond coating layer having a thickness of about 1–10 mils disposed over a major portion of the extruder screw which includes the root area, and a wear resistant coating layer having a thickness of about 10–100 mils disposed over said bond coating layer. The wear resistant coating layer preferably has an ASTM G65 dry abrasion wear rating of less than 10 mm$^3$/kilometer, or, in further embodiments, the bond coating layer has a coefficient of thermal expansion which is in between that of the wear resistant coating layer and the base alloy.

14 Claims, 2 Drawing Sheets

FOREIGN PATENT DOCUMENTS

| | | | |
|---|---|---|---|
| EP | 542631 | * | 5/1993 |
| EP | 801690 | * | 10/1997 |
| JP | 61183430 A2 | | 8/1986 |
| JP | 62019424 A2 | | 1/1987 |
| JP | 63162801 A2 | | 7/1988 |
| JP | 2-190465 | * | 7/1990 |
| JP | 03262624 A | | 11/1991 |
| JP | 4-18321 | * | 1/1992 |
| JP | 4371820 A2 | | 12/1992 |
| JP | 5-77308 | * | 3/1993 |
| JP | 9-85739 | * | 3/1997 |
| JP | 9150932 A2 | | 6/1997 |
| JP | 9150933 A2 | | 6/1997 |
| JP | 06190896 A | | 12/1997 |
| JP | 2002-326261 | * | 11/2002 |

* cited by examiner

WEAR RESISTANT EXTRUDER SCREW

FIELD OF THE INVENTION

The present invention relates to hard surfacing techniques generally, and in particular, to deposition techniques applied to extruder screws, such as those used in the screw feed mechanism of polymer injection molding and extrusion operations.

BACKGROUND OF THE INVENTION

Hard surfacing is the technique of welding or spray coating new or worn parts to combat wear, corrosion, or to build up a part to a larger size, or to repair a machining error or a casting defect. This technique has been used to build up low-carbon steel bearings and shafts for many decades. Although the primary object is to resist abrasion, hard surfacing must also tightly hold onto the base metal so that it will not flake or chip off.

In the polymer products industry, injection molding and extrusion methods are popular ways of making components. A common wear item in both production methods is the "extruder screw", which is used in a screw feed mechanism to deliver polymer pellets or granules which are then heated and passed through a die or into a mold under pressure. Extruder screws are increasingly being exposed to resinous materials having various additives, such as ceramic fillers and glass fibers which abrasively wear nickel-based alloy stainless steel and alloy steel, the popular choices for the base metal of such feed mechanisms. These base metals exhibit high tensile strength, but don't always hold up very well in high corrosion and wear environments.

Current techniques of achieving greater wear resistance for extruder screws include applying hard surfacing only on the major outer diameter surface of the screw, that portion which is most radially disposed from the central axis of the extruder screw. These hard facing materials have included welding, or spray coating applications, of cobalt or nickel-based alloys containing particles of high hardness, such as tungsten carbide. It has been determined that tungsten carbide particles have a tendency to wear other steel and stainless steel parts contacting these alloys in service. Tungsten is also very expensive and difficult to obtain on a regular basis.

Alternatively, ceramic materials have been applied to provide abrasion resistance to the flight surfaces of conveyor screws. In one commercial application, curved flight liners made of alumina ceramic tiles are fastened to the screw flight. The flight tile manufactured by Norten Pakco Industrial Ceramics division of Saint-Gobain Corporation, Latrobe, Pa., under the brand name Wearpak A96, can be designed to match the contour of the screw. These tiles are installed using high strength adhesives and welded inserts. While alumina oxide ceramic is one of the hardest materials known, next to a diamond, adhering tiles along the leading edge of a conveyor screw is expensive and time consuming. Such a process also does not provide a smooth flight surface, which can bind plastic particles and inadvertently increasing frictional contact.

Other methods of employing ceramic materials have also been used to protect extruder screws for injection molding machines or extrusion machines. For example, in U. S. Pat. No. 4,729,789, issued Mar. 8, 1988, a process for providing a sintered layer on a metallic core is provided whereby the sintered material creates a series of flights. The ceramic material is initially applied to a steel bar as a "green" compact, followed by a molding and isostatic pressing operation at a temperature at which the green compact is sintered to result in a "near net shape" extruder screw. While such a method does produce a ceramic material having a steel core, the resulting product is difficult to repair in service, since it would require repairing a structural ceramic material, rather than merely re-hard surfacing a steel flight. It is also unclear as to how such ceramic flights will resist cyclical roads having high tensile forces, since ceramic materials, by themselves, are known to be fairly brittle in tensile or torsional loading situations.

Accordingly there remains a need for a new or repaired extruder screw having high wear protection especially in the minor outer diameter flight sides or the root areas of an extruder screw. Such a need is especially apparent in the repair industry in which current industrial trends require perpetual rebuilding capability in order to reduce inventory and minimize down time.

SUMMARY OF THE INVENTION

In a first embodiment of the present invention, a wear resistant extruder screw is provided which is capable of being used in material conveyance, such as in transporting resin in injection molding and extrusion operations. The wear resistant extruder screw includes a base alloy extruder screw body having a plurality of flights, a major outer diameter and a minor inner diameter. Each of the flights of the extruder screw has a pair of flight sides disposed between the major outer diameter and the minor inner diameter. The flight sides and the minor inner diameter define a root area proximate to their juncture. In an important aspect of the first embodiment of this invention, a bond coating layer having a thickness of about 1–10 mils is disposed over a major portion of the extruder screw body which includes the root area. Disposed over the bond coating layer is a wear resistant coating layer having a thickness of about 10–100 mils, and an ASTM G65 dry abrasion wear rating of less than 10 $mm^3$/kilometer.

The extruder screws of this invention, are not limited to extrusion operations, as their name suggests, but can be employed in resin or material conveyance and injection molding operations as well. Such operations can include the transportation of grain, chemicals, waste, animal products, minerals (including augers), coal, wood fiber, and all sorts of industrial materials. They can be designed in flight sizes ranging from inches to feet, and provide wear resistance in the minor inner diameter, flight sides and root area of the extruder screw, where wear has been known to reduce screw life.

After the preferred wear resistant and bond coating layers wear during service, they can be perpetually replaced with further coating operations on site, or within a short distance, to a thermal spraying repair shop, without waiting for a new extruder screw to be manufactured. While prior art ceramic only and ceramic tile systems provide some measure of protection, they are either ignoring the vital root area of the screw, or contain elaborate and expensive sintering operations which do not lend themselves to on-site repair.

In further embodiments of this invention, the base alloy extruder screw body is prepared with an undercoating layer having a thickness greater than about 1 mil disposed over at least the root area. The undercoating layer desirably has a coefficient of thermal expansion which is (1) less than the coefficient of thermal expansion of the base extruder screw body, (2) greater than that for the wear resistant coating, or (3) both. Disposed over the undercoating layer of this embodiment is a wear resistant coating layer having a thickness of at least about 10 mils.

It will be understood by the teachings of this invention that the undercoating layer desirably bridges the thermal expansion capabilities of the base alloy extruder screw body and the wear resistant coating. Most desirably, the undercoating or bond coating layer of this invention has a coefficient of thermal expansion which is in between that of the wear resistant coating and the base alloy extruder screw body. In more preferred embodiments of this invention, a wear resistant coating layer is applied by thermally spraying molten ceramic material obtained from a rod or pellet form, and constitutes the application of substantially molten ceramic particles, as opposed to semi-molten particles which are known to form voids and inconsistencies in coatings bonded to base alloy screw bodies.

BRIEF DESCRIPTION OF THE DRAWINGS

The disclosed invention will be described with reference to the accompanying drawings, in which.

DETAILED DESCRIPTION OF THE INVENTION

As used herein, the following definitions shall apply:

"FUSION" means the melting of a metal or ceramic material to a liquid state, permitting two contacting or neighboring surfaces to partially exchange their contents with the result that there is a thorough blending of the compositions, at least to some degree, after cooling.

"CERAMIC" means a rigid, frequently brittle material made from clay or other inorganic, non-metallic substances and fabricated into articles by fusion, flame spraying, cold molding and firing, for example, at high temperature.

"THERMAL SPRAYING" includes any method of heating a ceramic material for application to a base material, such as a base metal; such processes include plasma spraying, flame spraying, Jetkote, Gatorgard, water plasma, plasma transfer arc, detonation gun, high-velocity oxygen flame and spark discharge, for example.

"ROOT AREA" means the region of an extruder screw at the base of the flights where the flight sides join the minor inner diameter of the extruder screw body.

The present invention provides wear resistant extruder screws in which the "root area" is protected from abrasion and corrosion by a coating having at least two components, a bond coating layer and a wear resistant coating layer. The improvement of wear resistance provided by the coatings of this invention makes them far more resistant to wear and abrasion then metals, such as stainless steel or low alloy steel, making them ideal for extruder screw service. This will improve service life for extruder screw applications, especially where polymer resin material containing an inorganic filler or glass fiber is used. The coatings of this invention also provide a certain measure of corrosion resistance, since the combination of undercoating layer and wear resistant layer can be designed to be inert in many plastics.

Figure 1:
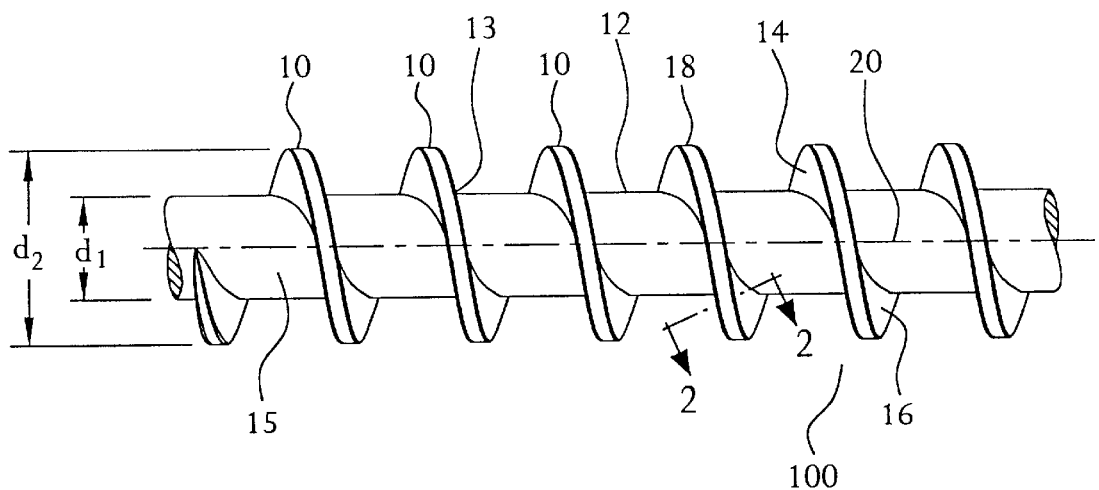
FIG. 1: is a partial side elevational view of an extruder screw having a plurality of flights thereon.
Figure 2:
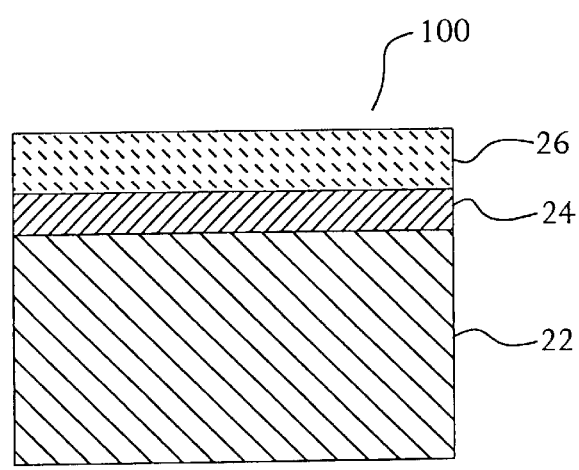
FIG. 2: is a cross-sectional view, taken through line 2—2 of FIG. 1, showing the various preferred layers of the wear resistant coating of the present invention.

With reference to the figures, and especially FIGS. 1 and 2, there are shown a preferred extruder screw 100 containing an extruder screw body 15 having a plurality of flights 10 disposed at a preferred oblique angle to the central axis 20 of the extruder screw body 15. The flights are desirably disposed in a screw-like configuration, so that when the extruder screw 100 rotates about its central axis 20, material disposed between the flights is directed along the axis 20 to a desired location. Each flight 10 includes a pair of flight sides 14 and 16, an outer diameter surface 18 and an inner diameter surface 12. In the region between the flights sides 14 and 16 and the inner diameter surface 12 a root area 13 is defined which desirably includes a small portion of the flight sides 14 and 16 and the inner diameter surface 12 and includes a small radius between them. This area often did not get much attention from hard surfacing procedures in the prior art. It has been known that repair techniques which ignore this root area often lead to premature life for extruder screws.

As shown in FIG. 1, the extruder screw 100 forms a inner diameter "$d_1$" and an outer diameter "$d_2$" at a defined radial distance from the central axis 20. These diameters define between them, a radial dimension of the flights 10. For example, "$d_1$" can range from about 0.5 to about 1 foot in diameter, and "$d_2$" can range from about 2 inches to about 8 feet in diameter.

The preferred components for the wear resistant coatings of this invention will now be described with reference to FIGS. 2 and 3. In the cross-section shown in FIG. 2, which is not drawn to scale, the base alloy 22 forms the largest amount of material in the cross-section of the extruder screw body 15. Corrosion resistant alloys suitable for this purpose contain alloy steels, cast or wrought iron, low and high carbon steels, nickel based alloys and stainless steel. In certain applications, cooper and aluminum base alloys may also be suitable. Specific examples of screw body alloys include AISI 4140 alloy steel, UNS S13800 (12.25–13.25 Cr, 7.5–8.5 Ni, 2.0–2.5 Mo) and S15500 (14.0–15.5 Cr, 3.5–5.5 Ni, 2.4–4.5 Cu) precipitation-hardened stainless steels, and Haynes alloy 242 (25 Mo, 8 Cr, Bal Ni) high temperature super alloy.

Layered onto the preferred base alloy 22 is a bond coating layer 24, also called an "undercoating" or "buttering" layer. The bond coating layer 24 of this invention is, preferably, corrosion resistant, increases bond strength and minimizes the problems associated with the thermal-expansion differential between metals and ceramics, such as those found between the preferred base alloy 22 and preferred wear resistant coating layer 26. A small, or negligible, differential in the coefficient of thermal expansion between layers is highly desirable when such coatings experience thermal cycling at elevated temperatures, such as when the extruder screw 100 is used to both transport and heat resinous materials. For example, if the extruder screw body is made of 316 stainless steel having a coefficient of thermal expansion (over a temperature range of about 70–212° F.) of about $8.8 \times 10^{-6}$ in/in ° F. (or, alternatively, using S15500 alloy which has a coefficient of $6 \times 10^{-6}$ in/in ° F., or S13800 alloy which has a coefficient of $5.9 \times 10^{-6}$ in/in ° F. over the same temperature range), and the wear resistant coating layer 26 comprises fused aluminum oxide (coefficient of about $3.9 \times 10^{-6}$ in/in –° F., at 70–212° F.), a Ni—Cr bond coating layer having a coefficient of thermal expansion of about $7.5$–$8.9 \times 10^{-6}$ in/in –° F. (at 70–212° F.) would be suitable.

In a preferred embodiment of this invention, the bond coating layer 24 comprises a nickle based alloy such as Ni—Cr, Ni—Cu, Ni—Cr—Fe, Ni—Cr—Mo (with coefficients of thermal expansion of about $6.5 \times 10^{-6}$–$9.1 \times 10^{-6}$ in/in ° F., at temperatures of 70–1,000° F.) preferably an 80/20 wt % Ni—Cr alloy layer having a thickness of about 1–10 mils, and more preferably, about 3–5 mils, is used. Such a coating can be applied with an automatic feed, stainless steel wire-type welding gun, having an inert argon-based atmosphere. The bond coating layer 24 desirably has a coefficient of thermal expansion which is about the same or less than that for said iron-based alloy, but which is preferably higher than the coefficient and thermal expansion for the wear resistant coating layer 26.

There are many classes of ceramic and metal coatings useful as hard surfacing materials. Wear-resistant coatings are known to act as thermal barriers in high temperature applications, but they also, desirably, provide wear resistance, friction reduction, corrosion resistance, erosion resistance, inertness, and non-magnetic properties. Most wear-resistant coating materials are available in rod or powder form. For powdered ceramics, the finer the grain, the denser the coating.

Both powered and rod ceramics are available in fused or unfused compositions. Fused ceramics offer the advantage of controlled chemistry, as well as particle shape and size. For this reason, they produce higher spray efficiency and improved control of the spray process. It is possible to combine one or more coatings to obtain a level of performance not found in a standard coating. For example, a layer of aluminum oxide, nickle chrome alloy, and/or zirconium oxide can provide a controlled thermal gradient with an intermediate thermal expansion buffering capability. In some cases, a third ceramic coating material, chromium oxide, is used on the face of the numerous coating layers to provide additional benefit of increased wear resistance.

Abrasion resistance is the most common application for this invention. Abrasion resistant coatings help to prevent wear, fraying, galling, rubbing or sliding wear, and particle erosion. Many ceramic coatings offer abrasion resistance that is superior to stainless steel, or even to steel hardened by laser or hard metal coating processes.

Desirable wear resistant coating layers 26 of this invention can include one or more of: chromium oxide, aluminum oxide, alumina titania, zirconium oxide, magnesium zirconate, yttria-stabilized zirconium oxide, and magnesium aluminate. Alternatively, metal wear-resistant coatings, such as tungsten carbide, tungsten-chromium carbide, chromium carbide, and tungsten-titanium carbide, could be used.

The choice of ceramic or metal wear-resistant coating depends primarily upon the end use for the extruder screw of this invention. For example, if electrical insulation and high abrasion resistance is called for, aluminum oxide is highly desirable. If thermal resistance takes precedent in a application, zirconium oxide, having a melting point close to 4,500° F. with good resistance to thermal shock, can be utilized. In a preferred embodiments of this invention, an application of 15–25 mil thickness of chromium oxide, aluminum oxide and/or zirconium oxide is highly desirable.

Ceramic coating systems can be chosen to provide the best bond strength for the individual application. Bond strength is often determined by the type of ceramic or metal employed, the differences in the coefficient of thermal expansion between the coating and the base metal, service preparation and the type of thermal spraying employed. The preferred ceramic coating of this invention desirably can be applied by oxygen acetylene powder, oxygen acetylene rod, plasma or a detonation gun. Alternatively, electron-beam vapor deposition can be used. In a powder flame spray system, ceramic powder is fed into a mixture of fuel gas and oxygen which is then detonated into a flame wick. The flame partially melts the ceramic powder before it is thrown onto a substrate. Because the powdered ceramic material remains in contact with the heat source for a very short period of time, all of the ceramic particles do not become completely molten. Accordingly, this mixture is desirable in low-performance applications.

In oxygen acetylene/rod systems, a fused ceramic material in rod form is introduced through a flame at a temperature of about 5,000° F. A high-pressure air stream blows the atomized molten particles onto the substrate of speeds up to 550 feet/second. The sequential melting and projection of the ceramic material is not concurrent, as it is in powdered-feed spraying methods. The larger particles produced by the rod process have higher kinetic energy and higher thermal mass, which produces fully molten particles at the substrate. This results in a coating with high particle-to-particle cohesive bonding. Bonding to the substrate and particle-to-particle bonding are key elements in producing high-quality, high-performance ceramic coatings for the wear resistant coating layer 26 of this invention. Additional methods which also are suitable for this invention include plasma systems, which are relatively expensive but introduce ceramic powder into an arc of a partially ionized gas (plasma) that produces high temperatures as high as 30,000° F. The high pressure plasma gas stream propels atomized molten ceramic particles onto a substrate. This method generally produces well bonded, high-density ceramic coatings, however, because of the short time the particles are exposed to the heat, there is sometimes incomplete melting. A detonation gun also has been used which creates an explosion of oxygen and acetylene producing temperatures of about 6,000° F. This explosion propels the melted ceramic particles at a great force out of a virtual gun barrel and onto a substrate at speeds of up to 25,000 feet/second.

Applicants have determined that the most desirable method of applying the ceramic coatings of this invention include the commercial oxygen acetylene/rod methods sold by Norton Pakco Industrial Ceramics division of Saint-Gobain Corporation, Latrobe, Pa. Physical properties of Norton Pakco's Rokide ceramic spray systems are described in table 1 below:

TABLE 1

PHYSICAL AND MECHANICAL PROPERTIES GUIDE
ROKIDE CERAMIC SPRAY SYSTEM

| COATING TYPE | COLOR | CRYSTAL PHASE | DENSITY G/CC | COATING HARDNESS DPH (300 G/LOAD) | POROSITY (TOTAL) | BOND STRENGTH (PSI) | SAND BLAST PENETRATION DEPTH/MM | FALEX WEARTEST (MM$^3$/KMS) |
|---|---|---|---|---|---|---|---|---|
| ROKIDE A (Aluminum Oxide) | white | gamma alumina | 3.2 | 772 | 12.0 | 3374 | .0265 | 47.9 |
| ROKIDE UHPA (Aluminum Oxide) | white | gamma alumina | 3.2 | 750 | 10.4 | 3841 | .0348 | 156.2 |
| ROKIDE SA (Aluminum Oxide) | white | gamma alumina | 3.2 | 825 | 13.5 | 3305 | .0347 | 70.4 |
| ROKIDE MBA (Aluminum Oxide) | grey/white | gamma alumina | 3.3 | 737 | 9.5 | 3206 | .0113 | 34.4 |
| ROKIDE MA (Magnesium Aluminate) | white | spinel alumina | 3.0 | 684 | 9.0 | 5303 | .0107 | 82.6 |
| ROKIDE C (Chrome Oxide) | black | eskolaste | 4.5 | 1215 | 8.4 | 4545 | .0016 | 3.3 |
| ROKIDE MBC (Chrome Oxide) | black | eskolaite + 2nd phase | 4.2 | 1003 | 9.8 | 4525 | .0054 | 7.9 |
| ROKIDE TC (Chrome Oxide) | black | eskolaite | 4.0 | 793 | 7.9 | 4186 | .0039 | 6.2 |
| ROKIDE MBAT 97/3 (Alumina Oxide) | grey | gamma aluminum | 3.2 | 805 | 10.8 | 3670 | .0068 | 33.6 |
| ROKIDE MBAT 87/13 (Alumina Titania) | blue/black | aluminum titanate | 3.4 | 640 | 8.2 | 4280 | .0028 | 82.2 |
| ROKIDE MBAT 60/40 (Alumina Titania) | blue/black | aluminum titanate | 3.4 | 644 | 11.4 | 5734 | .0037 | 96.5 |
| ROKIDE Z (Zircunium Oxide) | tan | cubic zirconia | 4.9 | 408 | 11.9 | 4106 | .0801 | 860.0 |
| ROKIDE EZ (Zirconium Oxide) | tan | cubic zirconia | 4.8 | 694 | 8.6 | 4621 | .0148 | 97.2 |
| ROKIDE ZS (Zirconium Silicate) | tan | cubic zirconia | 3.5 | 593 | 6.3 | 5070 | .0539 | 409.6 |

Figure 3:
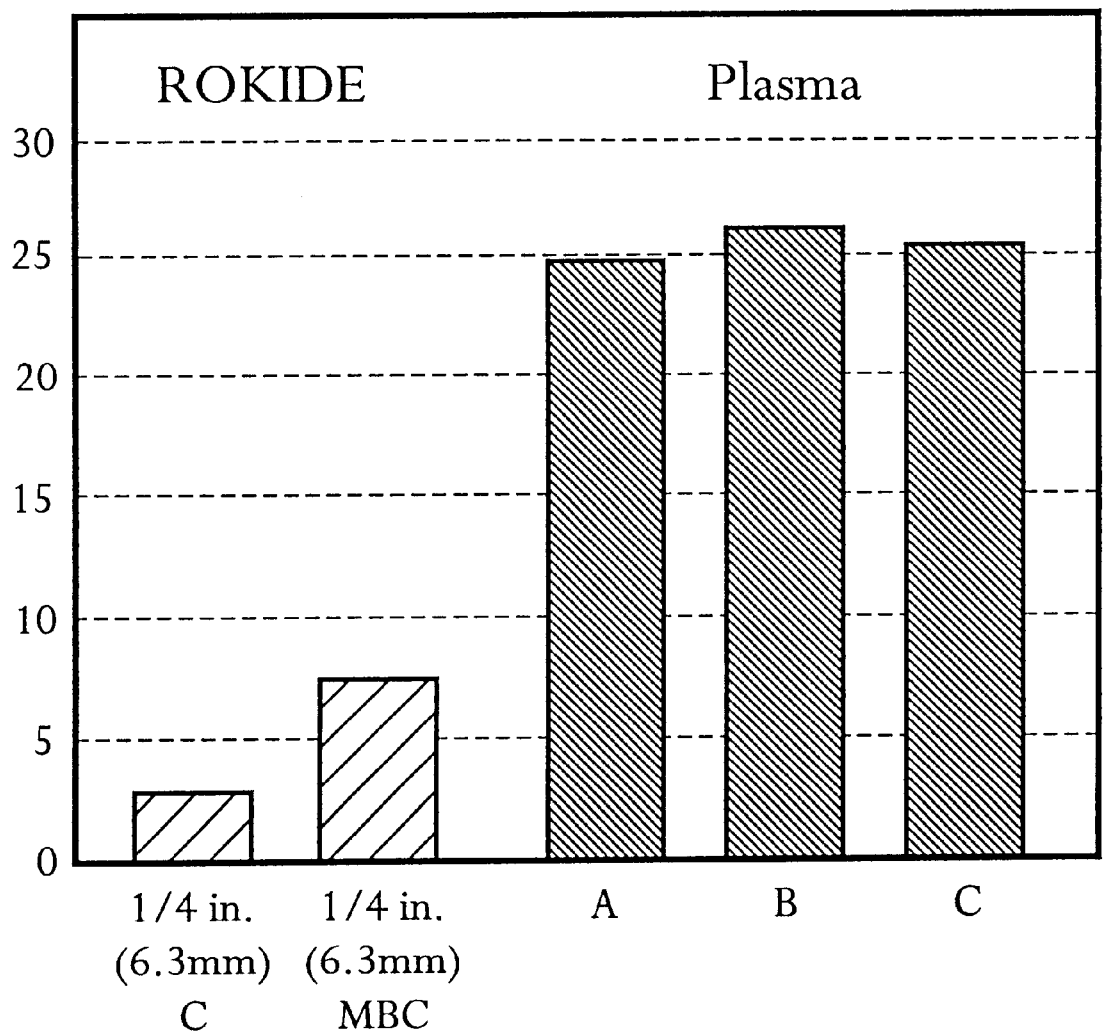
FIG. 3: is a bar chart comparing the dry abrasion wear (ASTM G65) of the preferred Rokide coating vs. conventional plasma-applied chrome oxide coatings.

Applicant has determined with reference to FIG. 3, that the Rokide C and Rokide MBC chromium oxide coatings are highly desirable for the wear resistant coating layer 26 of this invention. When applied in thicknesses of 10–100 mils, preferably about 15–25 mils, these coatings provide an ASTM G65 dry wear rating of less than 10 mm$^3$/kilometer. As shown in FIG. 3, the 0.25-inch application of the Rokide C and MMC coatings provided mean wear ratings within this range, and outperformed plasma chromium oxide coatings of the same thickness by greater than 50 percent.

The preferred ceramic coatings of this invention are desirably inert in polyvinyl chloride resin compositions and resist wear when in contact with aluminum-oxide and titanium-oxide fillers, reinforcing glass fibers, and molten resin formulations. The wear resistant coating layer 26 and bond coating layer 24 of this invention desirably are applied in coating operations consisting of several successive steps. A typical operation includes cutting about 10–150 mils from the extruder screw body 15, in a lathe, followed by cleaning the surface, such as by vapor de-greasing, oven baking, ultrasonic cleaning, etc. Surface preparation is regarded by most authorities as being the most critical step in applying a wear resistant coating. The coating strength is determined by how well it adheres to the substrate, and how well the coating particles adhere to one another. Coatings will not adhere to surfaces that are not properly cleaned and roughened.

Surface roughening is desirably employed after cleaning, and can consist of abrasive grit blasting, such as with aluminum oxide, angular steel grit, and silicon carbide. Following surface roughening, the desired bond coating layer 24 can be applied. The desired nickel-chrome alloys of this invention can be applied using direct welding, and thermal spraying techniques described above.

In the final operation, after the wear resistant coating layer 26 is applied, the coating composite layer is mechanically finished. Since a ceramic coating is usually harder than most metals, the thermal stress build-up must be avoided during finishing. Ceramics are also known to be brittle, and can easily crack during finishing operations. Precision grinders are the most common tool used in finishing a ceramic coating. Lapping, and grinding with specialized belts, are two widely used finishing alternatives. Surface finishing may not be required if the coating is to serve as a thermal barrier or provide wear resistance to a non-critical part, like some of the applications for this invention.

Accordingly, the wear resistant extruder screws of this invention provide improved service life, greater resistance to defects caused by differences in the coefficient of thermal expansion between layers, and greater bonding ability of wear resistant coatings over prior art hard surfacing techniques. Although various embodiments have been illustrated, this was for the purpose of describing, and not limiting the invention. Various modifications, which will become apparent to one skilled in the art, are within the scope of this invention described in the attached claims.

What is claimed:

1. A wear resistant extruder screw comprising:
    a base alloy extruder screw body having a plurality of flights, a major outer diameter and a minor inner diameter, each of said flights having a pair of flight sides disposed between said major outer diameter and said minor inner diameter, said flight sides and said minor inner diameter defining a root area proximate to their juncture;
    a bond coating layer having a thickness of about 1–10 mils disposed over a major portion of said extruder screw which includes said root area; and a wear resistant coating layer having a thickness of about 10–100 mils disposed over said bond coating layer, said wear resistant coating layer having an ASTM G65 dry abrasion wear rating of less than 10 mm$^3$/kilometer.

2. The extruder screw of claim 1 wherein said extruder screw body is abrasive grit blasted prior to the application of said bond coating layer.

3. The extruder screw of claim 2 wherein said abrasive grit blasted surface is substantially oil free.

4. The extruder screw of claim 3 wherein said bond coating layer comprises a metal alloy coating which has a coefficient of thermal expansion which is about less than or equal to the coefficient of thermal expansions for said base alloy.

5. The extruder screw of claim 1 wherein said wear resistant coating layer comprises chromium oxide or aluminum oxide.

6. The extruder screw of claim 1 wherein said wear resistant coating layer is applied using a fully molten ceramic precursor.

7. The extruder screw of claim 1 wherein said wear resistant coating layer is disposed on said flight sides, said major outer diameter and said minor inner diameter, as well as said root area.

8. The extruder screw of claim 1 wherein said bond coating layer comprises a Ni—Cr alloy layer.

9. The extruder screw of claim 1 wherein said bond coating layer has a thickness of about 3–5 mils, and said wear resistant coating layer has a thickness of about 15–25 mils.

10. A wear resistant extruder screw for delivering polyvinyl chloride resinous material to an extruder, comprising:

a nickel-based or iron-based alloy extruder screw body having a plurality of flights, a major outer diameter and an minor inner diameter, each of said flights having a pair of flight sides disposed between said major outer diameter and said minor inner diameter, said flight sides and said minor inner diameter defining a root area proximate to their juncture, said root area having a high propensity to undergo abrasive wear by said polyvinyl chloride resinous material;

a metallic undercoating layer having a thickness of greater than 1 mil disposed over at least said root area, said undercoating layer having a coefficient of thermal expansion which is less than the coefficient of thermal expansion of said nickel-based or iron-based alloy extruder screw body; and a wear resistant coating layer having a thickness of at least about 10 mils disposed over said undercoating layer, said wear resistant coating layer having an ASTM G65 dry abrasion wear rating of less than 10 mm$^3$/kilometer.

11. The extruder screw of claim 10 wherein said wear resistant coating layer comprises chromium oxide, aluminum oxide, zirconium oxide, or a combination thereof, having a DPH coating hardness of at least 300 G/LOAD.

12. The extruder screw of claim 10 wherein said wear resistant coating layer is applied by fully melting a ceramic rod or pellet, followed by thermal spraying it onto said iron-based extruder screw.

13. The extruder screw of claim 10 wherein said metallic undercoating layer comprises a nickel-chromium alloy.

14. The extruder screw of claim 10 wherein said wear resistant coating is chemically inert in PVC resin.

* * * * *